Patented May 23, 1950

2,508,457

UNITED STATES PATENT OFFICE 2,508,457

3-KETO-4-ACYLAMIDO-TETRAHYDRO-THIOPHENE

Stanton A. Harris, Westfield, N. J., assignor to Merck & Co., Inc., Rahway, N. J., a corporation of New Jersey No Drawing. Application September 16, 1944, Serial No. 554,451

11 Claims. (Cl. 260—329)

This invention is concerned generally with novel chemical compounds and processes of preparing the same; more particularly it relates to novel compounds useful as intermediates in synthesis of the growth-promoting factor, biotin.

Biotin is known to be one of the isomers of the chemical compound 2-(4'-carboxy-butyl)-3:4-ureido-tetrahydrothiophene, having the empirical formula $C_{10}H_{16}O_3N_2S$, and the structural formula:

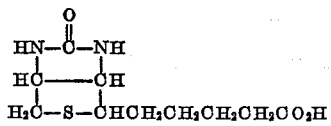

It is now found that this compound can be synthesized by reactions indicated as follows:

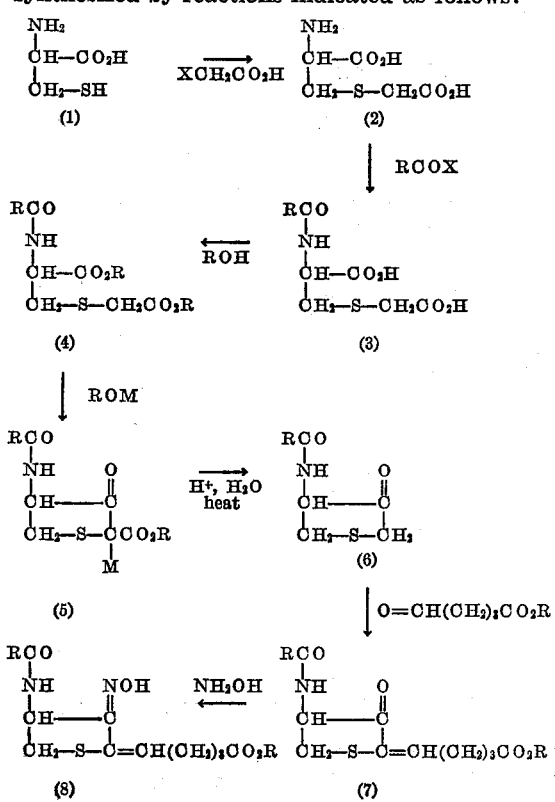

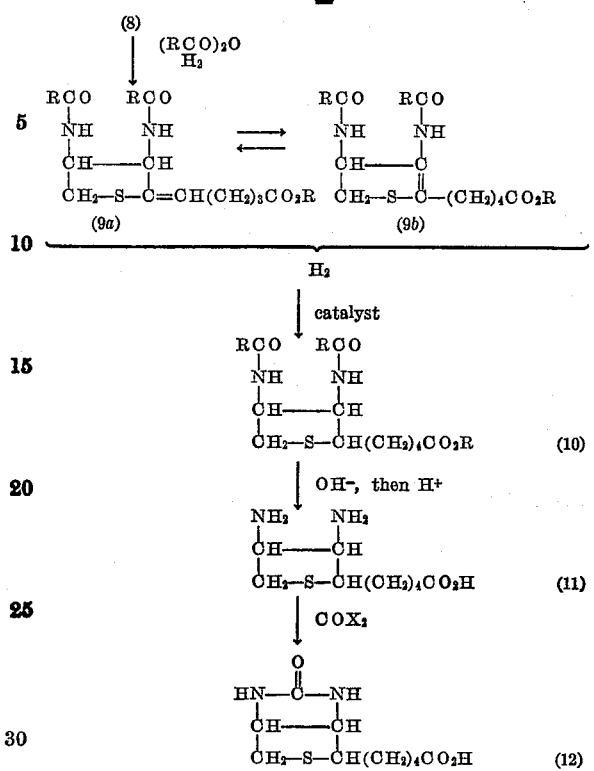

In the above formulae, R represents an alkyl, aryl or arylalkyl group; X, a halogen; and M an alkali metal or an alkaline earth metal.

The reactions above indicated are conducted as follows: 2-amino-3-mercapto-propanoic acid (1) and chloroethanoic acid are condensed in an alkaline aqueous solution to form 2-amino-3-carboxy-methylmercapto-propanoic acid (2); which is then treated with an acylating agent, such as an acyl halide, in an aqueous alkaline solution to yield 2-acylamido-3-carboxymethyl-mercapto-propanoic acid (3). This product is esterified using a mineral acid catalyst to produce the diester (4) of the acid (3), and the diester is treated with alkali metal alcoholate or an alkaline earth metal alcoholate to yield the 2-alkali metal or the 2-alkaline earth metal derivative of an ester of 2-carboxy-3-keto-4-acyl-amido-tetrahydrothiophene (5). This compound, when heated with a dilute mineral acid, is hydrolyzed and decarboxylated to produce 3-keto-4-acylamido-tetrahydrothiophene (6) which, when reacted with 4-carboxy-butanal ester in a lower aliphatic alcohol reaction medium containing piperidine and a lower aliphatic carboxylic acid, produces 2-(4'-carboalkoxy-butylidene)-3-keto-4-acylamido-tetrahydrothiophene (7). This product, when reacted with hydroxylamine yields an ester of the corresponding oxime, 2-(4'-carboxy-butylidene) - 3 - isonitroso - 4 - acylamido-tetrahydrothiophene (8) which upon treatment with a mixture of zinc, a lower aliphatic acid and a lower aliphatic acid anhydride, produces an equilibrium mixture of 2 - (4' - carboxy-butylidene) - 3:4 - di(acylamido) - tetrahydrothiophene ester (9a) and 2-(4'-carboxy-butyl)-3:4-di(acylamido)-4:5-dihydrothiophene ester (9b). This equilibrium mixture, or if preferred, one of the equilibrants, is then treated with hydrogen in the presence of a hydrogenation catalyst to yield 2-(4'-carboxy-butyl)-3:4-di(acylamido)-tetrahydrothiophene ester (10). When this last mentioned compound is treated with an aqueous alkaline solution, hydrolysis of the acyl groups occurs, yielding upon acidification, 2-(4'-carboxy-butyl) - 3:4 - diamino - tetrahydrothiophene (11) which, when reacted with a carbonyl halide, produces the compound 2-(4'-carboxy-butyl)-3:4-ureido-tetrahydrothiophene. This product is obtained as a mixture of stereoisomers, one of which is racemic biotin, from which upon resolution, is obtained the dextrorotatory isomer, biotin.

The present invention is concerned with intermediate 6 above, 3-keto-4-acylamido-tetrahydrothiophene, represented by the formula:

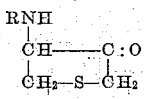

wherein R is an acyl group.

According to the present invention, compounds of this formula are obtained by treating a compound, which can be obtained as described in concurrently filed applications, Serial Nos. 554,449 and 554,450, having the type formula:

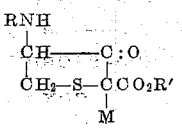

wherein R is an acyl group, R' is of the class consisting of alkyl, aryl and arylalkyl, and M is of the class consisting of hydrogen, alkali metals and alkaline earth metals, with a dilute acid at an elevated temperature, preferably at a temperature of the order of 100° C. The intermediate products thus obtained can be converted to the vitamin biotin by the reactions outlined above which are described in detail in concurrently filed applications, Serial Nos. 554,452, now Patent 2,452,653; 554,453, now Patent 2,460,224; 554,454, now Patent 2,459,817; 554,455, now Patent 2,487,050; 554,456, now abandoned; and 554,457, now abandoned.

These novel 3-keto-4-acylamido-tetrahydrothiophenes obtained according to this invention can be reacted with reagents characterized by reactivity with keto-functional groups to produce simple derivatives such as the oxime, semicarbazone, arylhydrazones, keto-addition products, etc.

The following examples illustrate methods of carrying out the present invention, but it is to be understood that these examples are given by way of illustration and not of limitation.

*Example 1*

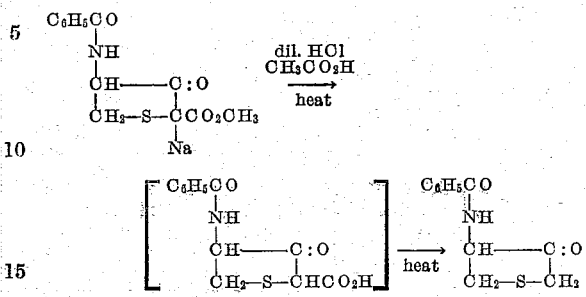

About 776 g. of the 2-sodium derivative of 2-carbomethoxy-3-keto-4-benzamido-tetrahydrothiophene are dissolved with warming in a mixture of 1940 cc. of water, 1940 cc. of glacial acetic acid, and 774 cc. of hydrochloric acid (conc.). To this solution is added about 650 cc. of water and the mixture heated under reflux until evolution of carbon dioxide ceases. The mixture is then cooled causing separation of 3-keto-4-benzamido-tetrahydrothiophene (M. P. 128–129° C.) which is removed and purified by conventional operations.

In like manner related compounds such as other alkali metal or alkaline earth metal derivatives and compounds having a different acyl group protecting the 4-amino substituent from reaction, can be treated as described to yield the corresponding 3-keto-4-acylamido-tetrahydrothiophene. Compounds of this class, which are prepared in a manner analogous to the process for preparing the 2-sodium derivative of 2-carbo-methoxy-3-keto-4-benzamido-tetrahydrothiophene, include the potassium, calcium and barium salts of the last mentioned compound and the sodium, potassium, barium and calcium salts of the following compounds:

2 - carboethoxy - 3 - keto - 4 - benzamido - tetrahydrothiophene
2 - carbopropoxy - 3 - keto - 4 - benzamido - tetrahydrothiophene
2 - carbobenzyloxy - 3 - keto - 4 - benzamido-tetrahydrothiophene
2 - carbomethoxy - 3 - keto - 4 acetylamido - tetrahydrothiophene
2 - carboethoxy - 3 - keto - 4 - acetylamidotetrahydrothiophene
2 - carbopropoxy - 3 - keto - 4 - acetylamido-tetrahydrothiophene
2 - carbobenzyloxy - 3 - keto - 4 - acetylamido-tetrahydrothiophene
2 - carbomethoxy - 3 - keto - 4 - propionamido-tetrahydrothiophene
2 - carbopropoxy - 3 - keto - 4 - propionamido-tetrahydrothiophene
2 - carbobenzyloxy - 3 - keto - 4 - propionamido-tetrahydrothiophene

*Example 2*

About 3 g. of the 2-sodium derivative of 2-carbomethoxy - 3 - keto - 4 - benzamido - tetrahydrothiophene are dissolved in a mixture of about 50 cc. glacial acetic acid and 10 cc. of concentrated hydrochloric acid, and the solution is refluxed for about an hour during which carbon dioxide is evolved. Heating is stopped when the evolution of gas ceases. Upon cooling, the product, 3-keto-4-benzamido-tetrahydrothiophene precipitates; it is removed and purified by conventional operations.

The oxime of 3-keto-4-benzamido-tetrahydrothiophene is prepared as follows: a solution of about 11 g. of 3-keto-4-benzamido-tetrahydrothiophene in methanol is mixed with about 5 g. of hydroxylamine hydrochloride and 8 g. of sodium acetate, and heated to about 50° C., then upon standing about a half hour crystals separate. The mixture is diluted with a small amount of water and cooled causing the precipitation of 3-oximino-4-benzamido-tetrahydrothiophene (M. P. 179–181° C.) which is removed by filtration. The benzoyl derivative of this oxime is prepared by mixing, with agitation, a solution of about 0.2 g. of 3-oximino-4-benzamido-tetrahydrothiophene in 30 cc. of sodium hydroxide (30%) and about 1 cc. of benzoyl chloride. The 3-O-benzoyloximino-4-benzamido-tetrahydrothiophene (M. P. 149–151° C.) separates and is removed by filtration and purified by recrystallization from ethanol. The acetyl derivative of the oxime is prepared by dissolving about 0.17 g. of 3-oximino-4-benzamido-tetrahydrothiophene in about 2 cc. of acetic anhydride and evaporating the solution by heating. The residue obtained is dissolved in ethanol, chilled and the product, 3-O-acetyloximino-4-benzamido-tetrahydrothiophene (M. P. 149–150° C.) is obtained as a precipitate.

The phenylhydrazone of the ketone is prepared by treating a solution of about 4.5 g. of 3-keto-4-benzamido-tetrahydrothiophene in 10–15 cc. of ethanol with a slight excess of phenylhydrazine hydrochloride and sodium acetate solution. The mixture is heated to about 50° C. for a few minutes, then cooled, causing precipitation of the phenylhydrazone of 3-keto-4-benzamido-tetrahydrothiophene (M. P. 190–191° C.) which is recovered by filtration and purified by recrystallization from ethanol.

In like manner the p-nitrophenylhydrazone of the ketone is prepared as follows: about 1 g. of 3-keto-4-benzamido-tetrahydrothiophene in methanol is refluxed with a chemical equivalent of p-nitrophenylhydrazine and a trace of hydrochloric acid. The solution is then cooled causing precipitation of the p-nitrophenylhydrazone of 3-keto-4-benzamido-tetrahydrothiophene (M. P. 206–207° C.) which is removed by filtration. The 3:4-dinitrophenylhydrazone of the ketone is prepared by treating a solution of 3-keto-4-benzamido-tetrahydrothiophene in a mixture of glacial acetic acid and concentrated hydrochloric acid with 0.2 g. of 3.4 dinitrophenylhydrazine. The 3.4-dinitrophenylhydrazone of 3-keto-4-benzamido-tetrahydrothiophene (M. P. 201–202° C.) is obtained as a precipitate which is recovered by filtration, and purified by recrystallization from alcohol.

By the term acyl as herein employed is meant the radical of an alkyl-carboxylic acid, an arylcarboxylic acid, an arylalkyl-carboxylic acid, a mono-ester of carbonic acid, or a mono-amide of carbonic acid.

Modifications may be made in carrying out the present invention without departing from the spirit and scope thereof and the invention is to be limited only by the appended claims.

What is claimed is:

1. A compound represented by the formula:

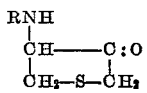

wherein R is an acyl group.

2. A compound of the formula:

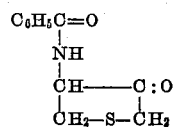

3. A compound of the formula:

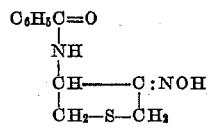

4. A compound of the formula:

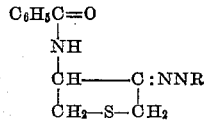

wherein R is an aryl group.

5. The process that comprises heating, at an elevated temperature of at least about 100° C., a 2-carboalkoxy-3-keto-4-acylamido tetrahydrothiophene with dilute acid to produce a 3-keto-4-acylamido tetrahydrothiophene.

6. The process that comprises heating, at an elevated temperature of at least about 100° C., 2-carbomethoxy-3-keto-4-benzamido tetrahydrothiophene with dilute acid to produce, 3-keto-4-benzamido tetrahydrothiophene.

7. A compound selected from the class which consists of ketones represented by the formula:

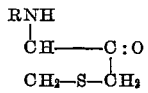

wherein R is an acyl group, and oximes, aryl hydrazones and semicarbazones of said ketones.

8. The process which comprises reacting with dilute acid a compound selected from the group consisting of compounds represented by the formula:

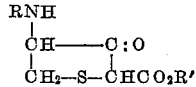

and 2-alkali and 2-alkaline earth metal derivatives thereof, wherein R is an acyl group and R' is a radical selected from the class which consists of hydrogen, alkyl, and arylalkyl radicals, said reaction being carried out by heating the reactants together at an elevated temperature, to produce a compound having the formula:

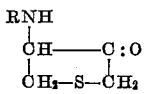

wherein R has the significance above-defined.

9. The process which comprises heating with dilute acid, at an elevated temperature of at least about 100° C., a compound having the formula:

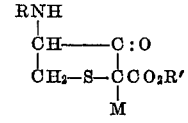

wherein R is an acyl group, R' is an alkyl group, and M is an alkali metal, to produce a compound of the formula:

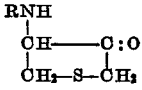

wherein R has the significance above-defined.

10. The process which comprises heating with dilute acid, at an elevated temperature of at least about 100° C., a compound represented by the formula:

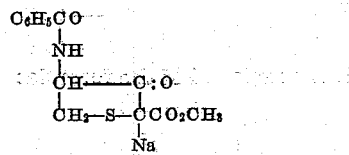

to produce a compound having the formula:

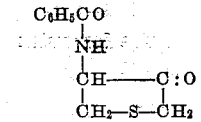

11. The process which comprises reacting a compound represented by the formula:

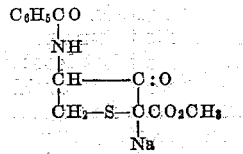

with dilute hydrochloric and acetic acid, said reaction being carried out by heating the reactants together at an elevated temperature of at least about 100° C., to produce a compound having the formula:

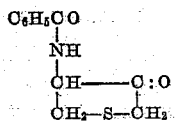

STANTON A. HARRIS.

REFERENCES CITED

The following references are of record in the file of this patent:

UNITED STATES PATENTS

| Number | Name | Date |
| --- | --- | --- |
| 2,472,433 | Moore et al. | June 7, 1949 |

OTHER REFERENCES

Fieser: "Organic Chemistry," Heath, 1944, page 314.